(12) United States Patent
Zhou

(10) Patent No.: US 9,927,821 B2
(45) Date of Patent: Mar. 27, 2018

(54) BUILDING ENERGY CONTROL SYSTEMS AND METHODS

(71) Applicant: INNOVATIVE BUILDING ENERGY CONTROL, Lake Forest, CA (US)

(72) Inventor: Gangyi Zhou, Lake Forest, CA (US)

(73) Assignee: INNOVATIVE BUILDING ENERGY CONTROL, Lake Forest, CA (US)

(*) Notice: Subject to any disclaimer, the term of this patent is extended or adjusted under 35 U.S.C. 154(b) by 0 days.

(21) Appl. No.: 15/164,717

(22) Filed: May 25, 2016

(65) Prior Publication Data

US 2017/0344038 A1 Nov. 30, 2017

(51) Int. Cl.
*H02P 27/00* (2006.01)
*G05D 25/02* (2006.01)

(52) U.S. Cl.
CPC .................. *G05D 25/02* (2013.01)

(58) Field of Classification Search
CPC .............. H02J 17/00; H01H 3/0213
USPC ....................... 318/400.3, 400.37
See application file for complete search history.

(56) References Cited

U.S. PATENT DOCUMENTS

| | | | | |
|---|---|---|---|---|
| 4,259,619 A | * | 3/1981 | Wall | H05B 39/06 307/115 |
| 4,654,626 A | * | 3/1987 | Carsello | H01C 10/14 338/172 |
| 4,820,938 A | * | 4/1989 | Mix | G08B 13/1609 307/116 |
| 4,987,372 A | * | 1/1991 | Ofori-Tenkorang | G01R 27/02 324/705 |
| 5,124,566 A | * | 6/1992 | Hu | H02H 3/24 307/116 |
| 5,262,678 A | * | 11/1993 | Flowers | H01H 3/0213 200/335 |
| 5,406,176 A | | 4/1995 | Sugden | |
| 5,449,275 A | * | 9/1995 | Gluszek | F04D 27/004 236/49.3 |
| 5,627,527 A | * | 5/1997 | Mehta | F04D 25/088 340/12.5 |
| 5,690,093 A | * | 11/1997 | Schrank | F24C 15/2064 126/299 D |
| 5,789,869 A | | 8/1998 | Lo et al. | |
| 6,225,766 B1 | * | 5/2001 | Ono | H01J 29/503 313/414 |
| 6,415,984 B1 | * | 7/2002 | Parker | F04D 25/088 236/49.3 |
| 6,933,686 B1 | * | 8/2005 | Bishel | G04G 15/006 307/115 |
| 7,336,041 B2 | | 2/2008 | Ayala | |
| 7,999,485 B1 | * | 8/2011 | Richards | H01R 13/652 315/177 |

(Continued)

*Primary Examiner* — Rina Duda
(74) *Attorney, Agent, or Firm* — Umberg Zipser LLP

(57) ABSTRACT

The inventive subject matter provides a system and a method for automatically controlling appliances via a mechanical controller. In one aspect of the invention, the system includes a first circuitry communicatively coupled with one or more sensors and configured to generate a motor controlling signal based in part on a reading from the sensor. The system also includes a mechanical device in contact with a lever of the mechanical controller. The system also includes a second circuitry configured to cause the mechanical device to move the lever as a function of the signal received from the first circuitry to control the appliance.

19 Claims, 3 Drawing Sheets

(56) References Cited

U.S. PATENT DOCUMENTS

| | | | |
|---|---|---|---|
| 8,339,062 B2* | 12/2012 | Cencur | H05B 33/0815 |
| | | | 315/194 |
| 8,497,636 B2 | 7/2013 | Nerone | |
| 8,508,148 B1* | 8/2013 | Carley | H01R 33/94 |
| | | | 200/51.02 |
| 8,823,268 B2* | 9/2014 | Saveri, III | H02J 17/00 |
| | | | 315/149 |
| 2004/0212321 A1 | 10/2004 | Lys et al. | |
| 2005/0128752 A1 | 6/2005 | Ewington et al. | |
| 2012/0147604 A1* | 6/2012 | Farmer | H05B 37/0254 |
| | | | 362/249.03 |
| 2012/0283878 A1* | 11/2012 | Roberts | H05B 37/0263 |
| | | | 700/275 |
| 2012/0286676 A1* | 11/2012 | Saveri, III | H02J 17/00 |
| | | | 315/159 |
| 2014/0117859 A1* | 5/2014 | Swatsky | H05B 37/0272 |
| | | | 315/158 |
| 2015/0048924 A1* | 2/2015 | Feldstein | G07C 9/00103 |
| | | | 340/5.51 |

* cited by examiner

BUILDING ENERGY CONTROL SYSTEMS AND METHODS

FIELD OF THE INVENTION

The field of the invention is smart appliances technology.

BACKGROUND

The following description includes information that may be useful in understanding the present invention. It is not an admission that any of the information provided herein is prior art or relevant to the presently claimed invention, or that any publication specifically or implicitly referenced is prior art.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

Traditional lighting control systems refer to the time-clock and the lighting switch, both of which have only two states: on and off. They are very simple and easy to install by electricians prior to installing lighting fixtures (or lighting devices) with which they are connected by hot wire and neutral wire.

In the past 10 years, we have seen the importance of green building making way for green building as today's standard. One of the major requirements of the green building standard is energy usage for lighting devices. Initially, the standard only applies to the energy rating of the lighting fixtures, but gradually, the standard began to outline detailed lighting control requirements. For example, the standard imposes that lighting devices in the daylight zone must be automatically dimmed by available ambient lights, lighting devices in small offices and conference rooms must be controlled by occupancy sensor; lighting devices in the corridor and parking garage must be dimmed by occupancy sensor. Due to these requirements, sophisticated lighting control systems were developed.

The key component for lighting control systems is the dimming portion. It is the device for modulating the electrical current to the lighting fixtures or the duty cycle, in order to control the luminance of the lighting fixtures. A majority of manual dimmers, such as Triode for Alternating Current (TRIAC), use resistor-capacitor circuits to adjust the duty cycle. U.S. Patent Publication 2004/0212321 to Lys et al. titled "Methods and Apparatus for Providing Power to Lighting Devices," filed May 9, 2003 discloses a dimming circuit using TRIAC.

Unfortunately, existing TRIAC types of dimmers only allow for manual dimming. For automatic dimming, current state of the art system uses electronic controller that requires device-specific drivers for different lighting fixtures. The driver can get modulated power from the central electronic controller to adjust luminance of the lighting fixtures. The central controller is powered from the electrical panel, and can collect signals from all the connected sensors (e.g., luminance sensors, occupancy sensors, etc.). Based on the settings, the central controller modulates the power electronically and sends the modulated power to the drivers. U.S. Pat. No. 5,406,176 issued to Sugden titled "Computer Controlled Stage Lighting System," filed Jan. 12, 1994 discloses an example of such an electronic dimming control system.

Other efforts that contributed to this field include:
U.S. Pat. No. 5,789,869 to Lo et al. titled "Light Sensitive Dimmer Switch Circuit," filed Sep. 17, 1996;
U.S. Pat. No. 7,336,041 to Ayala et al. titled "Automatic Light Dimmer for Electronic and Magnetic Ballasts (Fluorescent or HID)," filed Oct. 27, 2005;
U.S. Pat. No. 8,497,636 to Nerone titled "Auto-Switching TRIAC Compatibility Circuit with Auto-Leveling and Overvoltage Protection," filed Mar. 11, 2011; and
U.S. Patent Publication 2005/0128752 to Ewington titled "Lighting Module," filed Oct. 20, 2004.

The above explanation, the current systems have three major parts: drivers, controllers, and sensors. These systems all have lighting fixtures that do not receive power from the electrical panel directly but are fed from the central electronic controller through a device-specific driver. The controller and device-specific drivers are necessary, and the controller's capacity governs the number of lighting fixtures to be controlled by the sensors and switches.

These prior art lighting control systems, however, are dependent on the configuration on the controller. Therefore, the system must be installed and configured by electricians who are experienced and knowledgeable about these new types of central controllers. The driver, as the interface between the lighting fixture and the controller, must be compatible with the lighting fixtures and follow the controller' protocol. As such, in order to successfully implement these lighting dimming systems, the components must be very carefully selected, which requires a lot of coordination among electrical designers, control system vendors, light fixture vendors, and electricians during the construction of the building.

Thus, there is a need to provide a simple automatic lighting control system that can be installed and serviced easily by traditionally trained electricians.

SUMMARY OF THE INVENTION

The inventive subject matter provides apparatus, systems and methods for automatically controlling an external appliance via a mechanical controller. In some embodiments, the external appliance can be controlled directly by the mechanical controller. The mechanical controller includes a lever that can adjust an operating state of the external appliance. Preferably, the external applicant has more than two operating states among which the lever can be used to adjust. Even more preferably, the lever can be used to adjust the operating state of the external device along a continuous spectrum (e.g., non-discrete states).

In some embodiments, the system is communicatively coupled with one or more sensors for collecting ambient environmental data of an area. The system includes a first circuitry that is communicatively coupled with the one or more sensors, and is configured to generate a motor controlling signal based in part on sensor data retrieved from the one or more sensors. The system also includes a mechanical device that is configured to move the lever of the mechanical controller, for example, by physically moving a portion of the lever that the mechanical device is in contact with.

The system also includes a second circuitry that is communicatively coupled with the first circuitry and the mechanical device. The second circuitry is configured to cause the mechanical device to move the lever as a function of the signal received from the first circuitry to control the external device.

In some embodiments, the first circuitry includes a processing unit and an analog-to-digital converter. The analog-to-digital converter is configured to convert an analog signal received from the sensor to a digital signal and pass the digital signal to the processing unit. In some embodiments, the second circuitry includes a motor controller circuitry and a motor driver. In some of these embodiments, the motor driver includes a power amplifier used to amplify the digital signal from the motor controller circuitry to operate the mechanical device.

The system could use any suitable communication interface to transmit data from the one or more sensors, for example, the system could also include an RJ45 interface for communication with the one or more sensors.

In some embodiments, the second circuitry is communicatively coupled with the mechanical device via an RJ45 cable.

In some embodiments, the mechanically controller that controls the external device includes a mechanically controllable dimmer, such as a Triode for Alternating Current (TRIAC) device or a Thyristor.

In some embodiments, the mechanical device includes a track and a robotic fork that is movable along the track. The robotic fork can have a concavity designed to partially enclose and lock in the lever of the mechanical controller so that the robotic fork can be used to move the lever. Preferably, the mechanical device is configured to move the robotic fork to at least three positions along the track. Even more preferably, the mechanical device is configured to move the robotic fork to any position along the continuous, non-discrete path of the track.

In some embodiments, the first circuitry is further configured to select a power level from at least three power levels based in part on the reading from the sensor, embed information related to the selected power level in the motor controlling signal, and transmit the motor controlling signal to the second circuitry.

In addition, the second circuitry of some embodiments is further configured to cause the mechanical device to move the robotic fork to one of the at least three positions based on the motor controlling signal.

In some embodiments, the external device can be a lighting device, a fan, or any other controllable appliances. The sensor can include at least one of a luminance sensor, an occupancy sensor, a temperature sensor, and a humidity sensor.

Various objects, features, aspects and advantages of the inventive subject matter will become more apparent from the following detailed description of preferred embodiments, along with the accompanying drawing figures in which like numerals represent like components.

DETAILED DESCRIPTION

Figure 1:
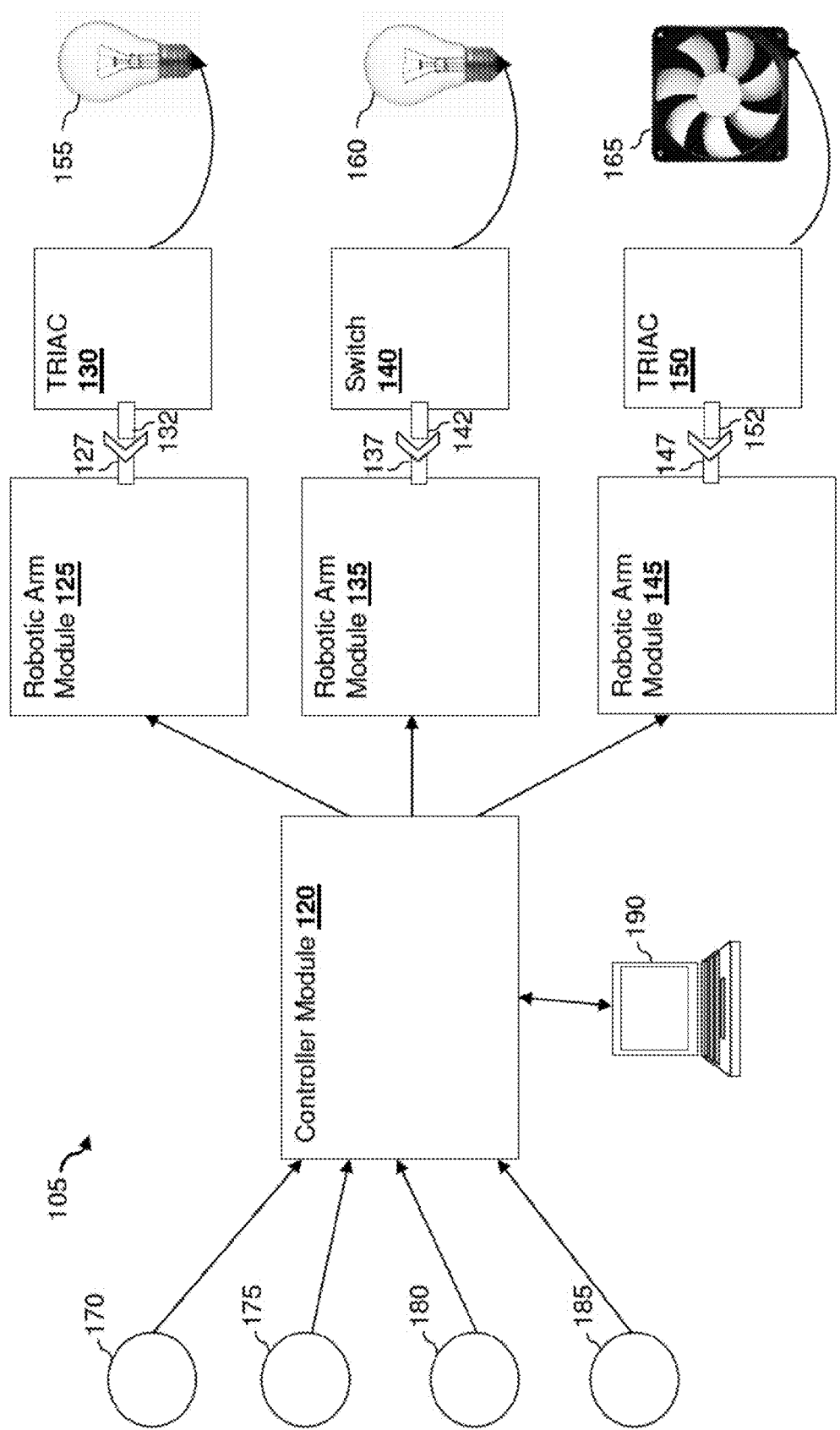
FIG. 1 illustrates an example smart appliance system for automatically controlling an external device via a mechanical controller.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

Unless the context dictates the contrary, all ranges set forth herein should be interpreted as being inclusive of their endpoints, and open-ended ranges should be interpreted to include commercially practical values. Similarly, all lists of values should be considered as inclusive of intermediate values unless the context indicates the contrary.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

It should be noted that any language directed to a computer system should be read to include any suitable combination of computing devices, including servers, interfaces, systems, databases, agents, peers, engines, controllers, or other types of computing devices operating individually or collectively. One should appreciate the computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclosed apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network. Computer software that is "programmed" with instructions is developed, compiled, and saved to a computer-readable non-transitory medium specifically to accomplish the tasks and functions set forth by the disclosure when executed by a computer processor.

One should appreciate that the disclosed techniques provide many advantageous technical effects including providing a simple universal solution for contractors to create automatic controllable appliances such as lighting fixtures that has the automatic dimming capabilities and fans that has the automatic speed adjustment capabilities.

The inventive subject matter provides apparatus, systems, and methods to automatically control a setting of an appliance using a mechanical controller. FIG. 1 illustrates an example smart appliance system 105 of some embodiments for automatically control a setting of an external appliance, such as a lighting fixture or a fan. As shown, the smart appliance system 105 includes a controller module 120 and one or more robotic arm modules (such as robotic arm modules 125, 135, and 145). In some embodiments, the controller module 120 includes a circuitry having at least one processing unit (e.g., a processor, a processing core, etc.) and memory (e.g., erasable programmable read-only memory (EPROM), etc.). In some embodiments, the controller module 120 may simply include a memory (e.g., EPROM, etc.) and a circuitry that processes input signals and produces associated output signals based on data stored on the memory.

Each of the robotic arm modules 125, 135, and 145 includes a mechanical device (e.g., a mechanical arm, a mechanical fork, etc.) that is movable along a track, and a circuitry for controlling the movement of the mechanical device. For example, the robotic arm module 125 includes a mechanical fork 127, the robotic arm module 135 includes a mechanical fork 137, and the robotic arm module 145 includes a mechanical fork 147. As mentioned above, an appliance in homes and offices, such as a lighting fixture or a fan, can be controlled by a mechanical controller, such as a mechanical switch or a TRIAC controller. These mechanical controllers have a common characteristic in that they all have a mechanical lever for adjusting a operating state of the appliance (e.g., on/off switch, dimming slider, etc.). Preferably the appliance has more than two operating states (i.e., can be adjustable in more ways than just an on/off switch) and can be adjustable by the mechanical controller to any one of these operating states.

Preferably, the mechanical device of each robotic arm module is in contact with a mechanical controller associated with an appliance, which the robotic arm module is designed to control. For example, each of the robotic arm modules 125, 135, and 145 can include a mechanical fork that has a cavity to lock the lever of the mechanical controller. For example, the mechanical fork may have a cavity or a recess between two protruded sections that embrace at least a portion of the lever in order to move the lever. In other embodiments, the mechanical fork may include gear teeth to move the lever. The recess between two teeth of the gear can hold a portion of the lever such that moving the gear would cause the lever to move.

As shown in this example, the robotic arm module 125 is configured to control a lighting fixture 155 via a TRIAC controller 130, the robotic arm module 135 is configured to control another lighting fixture 160 via a switch 140, and the robotic arm module 145 is configured to control a fan 165 via a TRIAC controller 150. The TRIAC controller 140 has a mechanical lever 132 that can be moved to adjust the luminance level of the lighting fixture 155. The switch 140 includes a mechanical lever 142 that can be flipped to turns on and off the lighting fixture 160. The TRIAC controller 150 includes a mechanical lever that can be moved to adjust the speed of the fan 165.

Thus, the robotic arm module 125 is configured to use its mechanical device 127 (e.g., a mechanical fork) to move the mechanical lever 132 of the TRIAC controller 130 to control and/or adjust a luminance setting of the lighting fixture 155. Similarly, the robotic arm module 135 is configured to use its mechanical device 137 to move the lever 142 of the switch 140 to turns the lighting fixture 160 on and off. The robotic arm module 145 is configured to use its mechanical device 147 to move a lever 152 of the TRIAC 150 to control and/or adjust a speed setting of the fan 165.

In some embodiments, the controller module 120 is communicatively coupled with one or more sensors (e.g., sensors 170-185) over a network. In some embodiments, the controller module 120 can be communicatively coupled with the sensors 170-185 via RJ45 cables. The sensors 170-185 can be of different types and at different locations within a boundary (e.g., within a home, within an office, etc.). For example, the sensor 170 can be a luminance sensor that detects an ambient luminance level and produces a signal (e.g., an analog luminance reading, etc.), the sensor 175 can be an occupancy sensor that detects movement within a geographical boundary (e.g., within an office, within a room, etc.) and produce a reading based on the detected movement, the sensor 180 can be a temperature sensor that produces a temperature reading based on the ambient temperature, and the sensor 185 can be a humidity sensor that produces a The controller module 120 is programmed to periodically (e.g., every second, every five seconds, every minute, etc.) retrieve sensor data from the sensors 170-185. Based on the retrieved sensor data, the controller module 120 in some embodiments is programmed to compute and generate a signal for each appliance that it controls (e.g., the lighting fixture 155, the lighting fixture 160, and the fan 165, etc.). In some embodiments, the generated signal indicates an operating setting for that appliance.

Once generated the signal, the controller module 120 of some embodiments is programmed to transmit the signal to the corresponding robotic arm module (e.g., over an RJ45 cable, etc.). For example, when the controller module 120 has generated a signal for setting an operating setting for the lighting fixture 155, the controller module 120 is programmed to send the signal to the robotic arm module 125. Similarly, when the controller module 120 has generated a signal for setting an operating setting for the lighting fixture 160, the controller module 120 is programmed to send the signal to the robotic arm module 135. When the controller module 120 has generated a signal for setting an operating setting for the fan 165, the controller module 120 is programmed to send the signal to the robotic arm module 145.

When the corresponding robotic arm module receives the signal, the circuitry within the robotic arm module is configured to cause the mechanical device of the robotic arm module to move along the track according to the instructions embedded in the received signal, and in turn moving the lever of the mechanical controller of the corresponding appliance. For example, when the sensor readings from sensors 170-185 indicate that the ambient light luminance level has passed a certain pre-determined threshold, the controller module 120 is programmed to send a signal to the robotic arm modules 125 and 135 to dim the lighting fixtures 155 and 160 below a certain level. The robotic arm modules 125 and 135 in turn is configured to move the mechanical devices 127 and 137 according to the signal, which in turn moves the levers 142 and 152 of the TRIAC controller 130 and the switch 140, respectively, to dim the lighting fixture 155 and switches off the lighting fixture 160.

In some embodiments, the controller module 120 is also communicatively coupled with a user computing device 190 (e.g., over a network), such that a user such as an administrator can program/configure the smart appliance system 105 to control the appliances differently under different sensed condition.

Figure 2:
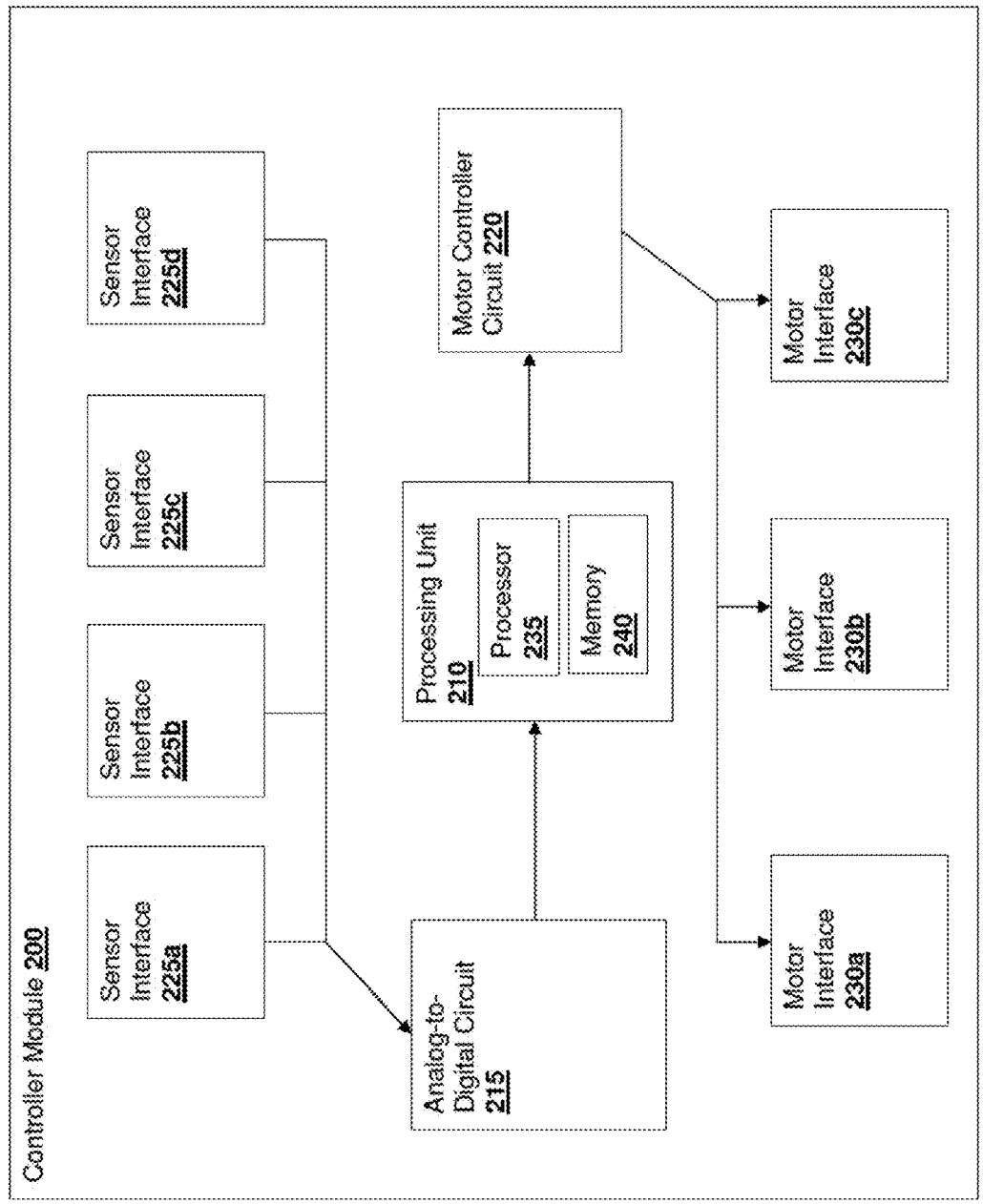
FIG. 2 illustrates the schematic of an example controller module of some embodiments.

FIG. 2 illustrates the schematic of an example controller module 200 that can be implemented in the smart appliance system 105. The controller module 200 includes a processing unit 210, an analog-to-digital circuit 215, a motor controller circuit 220, several sensor interfaces 225a-225d, and several motor interfaces 230a-230c. The processing unit 210 of some embodiments may include a processor 235 and memory 240.

The sensor interfaces 225a-225d can be any types of interfaces that is capable of communication with an external sensor device. An example of such an interface is an RJ45 interface (RJ45 connector) when the sensors (not shown) are connected with the controller module 200 via RJ45 cables. In some embodiments, the processing unit 210 is programmed to retrieve sensor data from the sensors via the sensor interfaces 225a-225d periodically (e.g., every second, every 5 seconds, etc.). Once retrieved, the sensor data in its original analog format would go through the analog-to-digital circuit 215. The analog-to-digital circuit 215 can be implemented as any type of existing analog-to-digital converter, an example of which is described in U.S. Pat. No. 7,498,962 to Alfano et al. titled "Analog-to-Digital Converter with Low Power Track-and-Hold Mode," filed Dec. 29, 2006. The analog-to-digital circuit 215 is configured to convert the sensor data from its original analog format to a digital format, and passes the sensor data in digital format to the processing unit 210.

In some embodiments, the processing unit 210 includes a processor or a processing core, and a non-volatile memory (e.g., a flash memory, etc.). An example of such a processing unit 210 is an erasable programmable read-only memory (EPROM). The motor controller circuit 220 is configured to generate a signal that is understandable by the intended robotic arm module to the intended robotic arm module via the corresponding motor interface. In some embodiments, the processing unit 210 can be pre-programmed with instructions for how to adjust to the appliances under a certain condition detected by the sensors. For example, the processing unit 210 can be pre-programmed such that it corresponds the motor interface 230a with the robotic arm module 125 for controlling the lighting fixture 155, corresponds the motor interface 230b with the robotic arm module 135 for controlling the lighting fixture 160, and corresponds the motor interface 230c with the robotic arm module 145 for controlling the fan 165. The processing unit 210 can then be pre-programmed to instruct the motor controller circuit 220 to send a signal to the robotic arm module 125 via the motor interface 230a to dim the lighting fixture 155 when it is detected that the ambient light is above a certain predetermined level, to instruct the motor controller circuit 220 to send a signal to the robotic arm module 135 via the motor interface 230b to turn off the lighting fixture 160 when it is detected that no one is occupying the room, and to instruct the motor controller circuit 220 to send a signal to the robotic arm module 145 via the motor interface 230c to reduce the speed of the fan when the ambient temperature has fallen below a certain predetermined threshold.

In some of these embodiments, the processing unit 210 of the controller module 200 is also programmed to provide a user interface (e.g., a graphical user interface that can be displayed on a screen of a computing device) to enable the user to program the controller module 200 to operate differently under different sensed condition. The user input can be stored in the memory 240 that can later be retrieved by the processor 235 to generate the signals based on the sensor data.

As the processing unit 210 continues to receive updated sensor data via the sensor interfaces 225a-225d that has been converted by the analog-to-digital circuit 215, the processing unit is programmed to send new instructions to the motor controller circuit 220 to send updated signals to the various robotic arm modules 125, 135, and 145.

Figure 3:
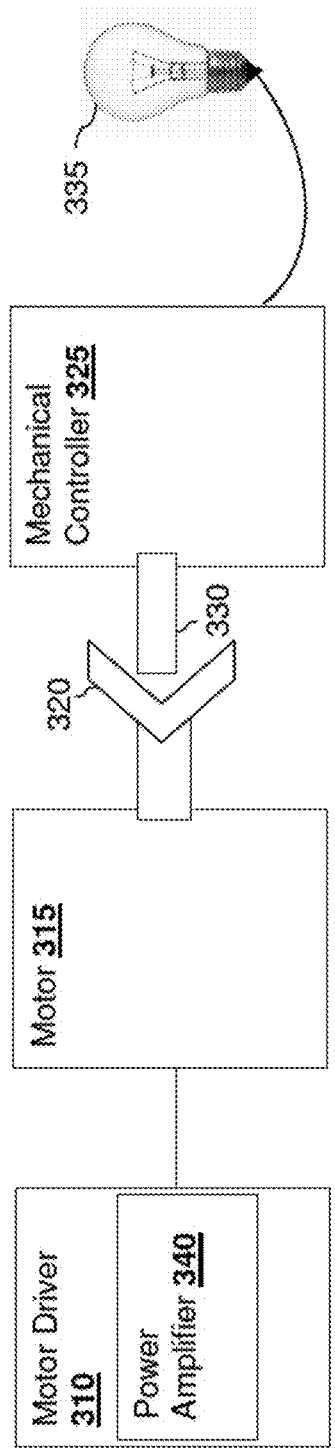
FIG. 3 illustrates the schematic of an example robotic arm module of some embodiments.

FIG. 3 illustrates the schematic of an exemplary robotic arm module 300 that can be used to implement any one of the robotic arm modules 125, 135, and 145. The robotic arm module 300 is designed to control an appliance 335 (e.g., a lighting fixture, a fan, etc.) via a mechanical controller 325. The mechanical controller 325 can be a TRIAC controller, a switch, or any kind of appliance controlling devices that includes a lever for adjusting an operating state of the appliance.

The robotic arm module 300 includes a motor driver 310, a motor 315, and a mechanical device 320. In some embodiments, the motor driver 310 is optional. The motor driver 310 of some embodiments includes a power amplifier 340 to amplify the signal from the controller module 120 to drive the motor 315. The mechanical device 320 can include a mechanical fork that is movable along a track (not shown). The track and the mechanical fork can be designed to accommodate the design of the mechanical controller 325. For example, if the mechanical controller 325 is a TRIAC controller with a lever 330 that can be moved along a linear track to adjust a power setting (e.g., luminance level, speed level, etc.) of the corresponding appliance 335, the motor 315 can include a linear track and a mechanical fork 320 that has a cavity sufficiently large to partially enclose the lever 330 to move the lever 330. The motor 315 of some embodiments is configured to move the mechanical fork 320 along the linear track of the motor 315 so that the motor 315 can cause the lever 330 to move along the linear track of the TRIAC controller 325.

In another example, if the mechanical controller 325 is a simple switch that can be flipped up and down to change the operating state of the appliance 335, the motor 315 can include a concave track and a mechanical fork 320 that has a cavity sufficiently large to partially enclose the lever 300 to move the lever 330. The motor 315 of some embodiments is configured to move the mechanical fork 320 along the concave track of the motor 315 so that the motor 315 can cause the lever 330 to flip and thereby change the different operating states of the appliance 335.

In the last example, the mechanical controller 325 can be a valve. The motor 315 of some embodiments is configured to adjust the valve such that the flow path can be altered to achieve energy saving purpose.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A system for automatically controlling an external device using a mechanical controller based on readings from a sensor, wherein the mechanical controller comprises a lever, the system comprising:
    a first circuitry communicatively coupled with the sensor, and configured to generate a motor controlling signal based in part on a reading from the sensor;
    a mechanical device in physical contact with at least a portion of the lever of the mechanical controller, and configured to physically move the portion of the lever from a first position to a second position, and from the second position to a third position, wherein the first, second, and third positions are different; and
    a second circuitry communicatively coupled with the first circuitry and the mechanical device, and configured to cause the mechanical device to physically move the portion of the lever from the first position to the second position, as a function of the motor controlling signal received from the first circuitry, to thereby control the external device, wherein the external device has first, second and third operating states that are controlled by movement of the portion of the lever to the first, second, or third positions, respectively.

2. The system of claim 1, wherein the first circuitry comprises:
    a processing unit; and
    an analog-to-digital converter configured to convert an analog signal received from the sensor to a digital signal and pass the digital signal to the processing unit.

3. The system of claim 1, wherein the second circuitry comprises:
    a motor controller circuitry; and
    a motor driver.

4. The system of claim 3, wherein the motor driver comprises a power amplifier.

5. The system of claim 1, wherein the second circuitry is communicatively coupled with the mechanical device via an RJ45 cable.

6. The system of claim 1, wherein the mechanical controller comprises a mechanically controllable dimmer having at least one of a linear motor and a potentiometer.

7. The system of claim 1, wherein the mechanical device comprises a track and a robotic fork movable along the track.

8. The system of claim 7, wherein the robotic fork comprises a concavity for partially enclosing the lever of the mechanical controller.

9. The system of claim 7, wherein the mechanical device is configured to move the robotic fork to at least three positions along the track to move a slider to one of at least three operating states.

10. The system of claim 9, wherein the first circuitry is further configured to:
    select a power level from at least three power levels based in part on the reading from the sensor;
    embed information related to the selected power level in the motor controlling signal; and
    transmit the motor controlling signal to the second circuitry.

11. The system of claim 10, wherein the second circuitry is further configured to cause the mechanical device to move the robotic fork to one of the at least three positions based on the motor controlling signal.

12. The system of claim 1, wherein the external device comprises one of a lighting device and a fan.

13. The system of claim 1, wherein the sensor comprises at least one of a luminance sensor, an occupancy sensor, a temperature sensor, and a humidity sensor.

14. The system of claim 1, further comprising a user interface that enables a user to configure how the second circuitry causes the mechanical device to move the lever as a function of the signal.

15. The system of claim 14, wherein the user interface enables the user to configure how rapidly the light dims.

16. The system of claim 14, wherein the user interface enables the user to configure a minimum and maximum luminosity of the external device.

17. The system of claim 9, wherein the slider comprises a dimming slider that adjusts a luminance level of a lighting fixture.

18. The system of claim 17, wherein the mechanical device is configured to move the lever to any position along a continuous, non-discrete path of the track to adjust a power setting of an appliance.

19. The system of claim 1, wherein the mechanical device comprises a power amplifier that amplifies the motor controlling signal to physically move the portion of the lever.

* * * * *